UNITED STATES PATENT OFFICE.

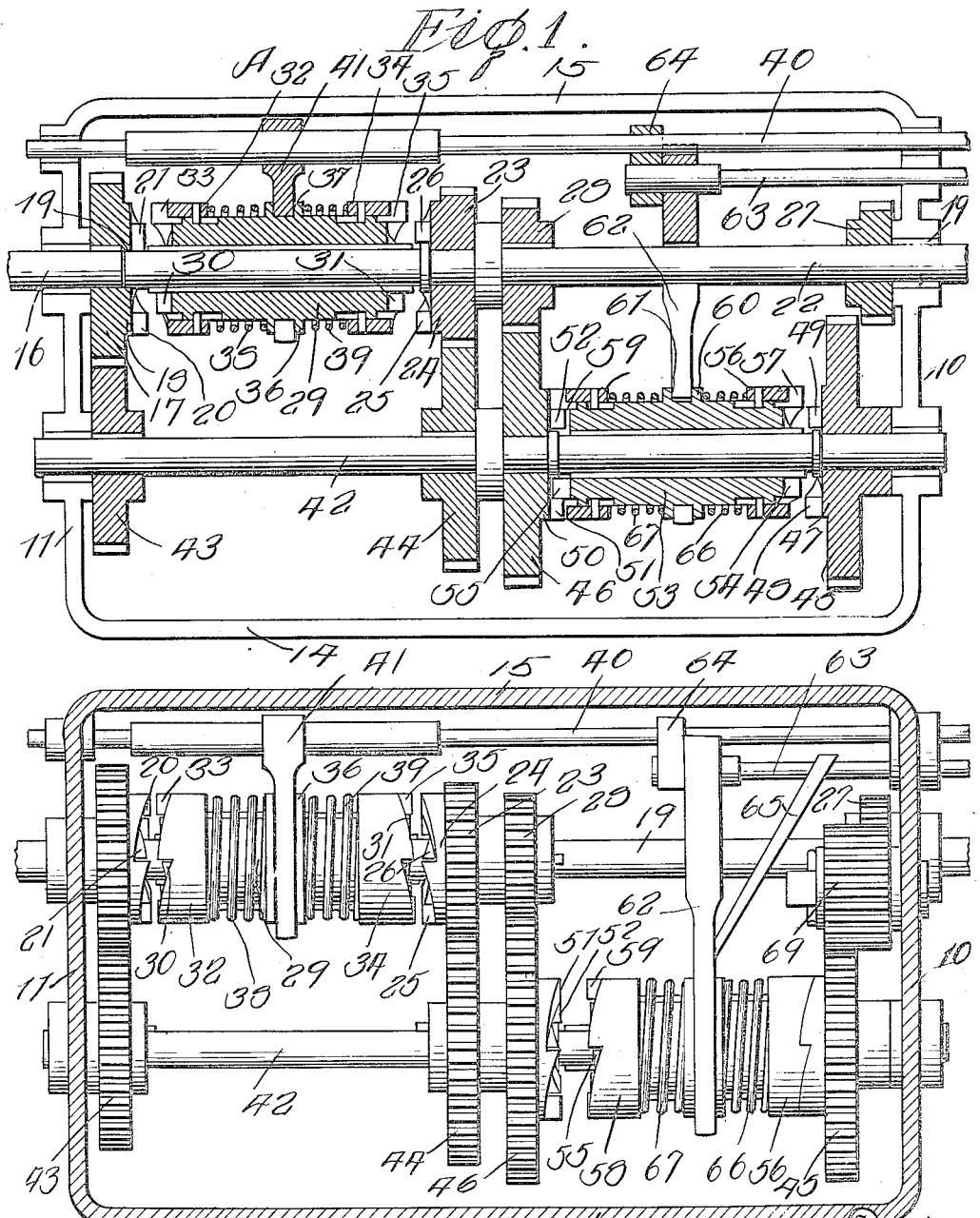

FLOYD E. LAND, OF MEDFORD, OREGON.

CLUTCH MECHANISM FOR TRANSMISSION-GEARINGS.

1,225,144.  Specification of Letters Patent.  Patented May 8, 1917.

Application filed July 17, 1913. Serial No. 779,619.

*To all whom it may concern:*

Be it known that I, FLOYD E. LAND, a citizen of the United States, residing at Medford, in the county of Jackson, State of Oregon, have invented certain new and useful Improvements in Clutch Mechanisms for Transmission-Gearings; and I do hereby declare the following to be a full, clear, and exact description of the invention, such as will enable others skilled in the art to which it appertains to make and use the same.

This invention relates to clutch mechanisms for transmission gearings.

The object of the invention is to provide a clutch of the type named embodying a novel simple construction, which will be efficient in operation and reliable.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a vertical section through a transmission gearing embodying the invention, and Fig. 2, a view similar to Fig. 1 with the clutch mechanism in elevation and the parts in a different position from that shown in Fig. 2.

Referring to the drawings the improved transmission gearing is shown as comprising a casing A which includes a front member 10, rear member 11, side members, a bottom 14, and a top 15. Journaled in the rear member 11 is one end of the driven shaft 16 which is adapted to be suitably connected with the rear axle of an automobile to effect the rotation thereof. Fixed on the shaft 16 adjacent the inner face of the rear member 11 is a gear 17 and formed on the side of the gear 17 remote from the rear member 11 is an extension 18 provided centrally with a bearing opening 19. The outer end of the extension 18 is provided with a plurality of outer teeth 20 and a plurality of inner teeth 21, the latter being reversed with relation to the former. Journaled in the front member 10 and in the opening 19 is a drive shaft 22 which is adapted to be coupled directly to the crank shaft of the engine. Loosely mounted on the drive shaft 22 is a gear 23 which has formed on the side thereof adjacent the gear 17 an extension 24 provided with a plurality of outer teeth 25, and a plurality of inner teeth 26 reversed with relation to said outer teeth. Fixed on the shaft 22 adjacent the inner side of the front member 10 is a gear 27 and also fixed on said shaft 22 between the gear 27 and the gear 23 is a gear 28. Slidably and non-rotatably mounted on the shaft 22 between the gears 17 and 23 is a sleeve 29 one end of which is provided with teeth 30 adapted for coöperation with the teeth 21 on the extension 19, while the other end thereof is provided with teeth 31 adapted for coöperation with the teeth 26 of the extension 24. Non-rotatably and slidably mounted on the end of the sleeve 29 adjacent the gear 17 is a sleeve 32 the outer end of which is provided with teeth 33 reversed with relation to the teeth 30 and adapted for coöperation with the teeth 20 on the extension 18. Also non-rotatably and slidably mounted on the sleeve 29 is a sleeve 34 which has formed on the end thereof adjacent the gear 23 teeth 35 adapted for coöperation with the teeth 25 on the extension 24. Formed circumferentially of the center of the sleeve 29 or between the sleeves 32 and 34 is a circumscribing flange 36 provided in its periphery with a groove 37. Encircling the sleeve 29 between the sleeve 32 and the flange 36 is a spiral spring 38 one end of which bears against said flange and the other end against the inner end of the sleeve 32. Also encircling the sleeve 29 between the flange 36 and the sleeve 34 is a spiral spring 39 one end of which bears against the inner end of the sleeve 34 while the other end thereof bears against the flange 36. These springs 38 and 39 constantly tend to hold the sleeves 32 and 34 at the limit of their outward movement and it will be here noted that the teeth 33 and 35 are of slightly greater depth than the teeth 20 and 25 for a purpose that will presently appear.

Slidably mounted in the front member 10 and rear member 11 of the casing A is a rod 40 which carries a depending yoke 41 the arms of which embrace the sleeve 29 and are engaged in the groove 37 so that upon sliding the rod 40 a corresponding sliding movement will be imparted to the sleeve 29 on the drive shaft 22.

Journaled in the front member 10 and the rear member 11 is a secondary shaft 42. Fixed on the shaft 42 are gears 43 and 44 which mesh respectively with the gears 17 and 23, it being noted that the gear 44 is considerably larger in diameter than the gear 23 so that when said gear 44 is rotated through the medium of the gear 23 the shaft 42 will be rotated less rapidly than the shaft 22. Loosely mounted on the shaft 42 are gears 45 and 46, the latter meshing with the gear 28 on the shaft 22. The side of the gear 45 adjacent the front member 10 is formed with an extension 47 and said extension is provided with inner and outer teeth 48 and 49 respectively, the latter being reversed with relation to the former. The side of the gear 46 opposite the extension 47 is formed with an extension 50 and said extension is provided with inner and outer teeth 51 and 52 respectively, the latter being reversed with relation to the former. Non-rotatably and slidably mounted on the shaft 42 between the gears 45 and 46 is a sleeve 53, one end of which is provided with teeth 54 adapted to coöperate with the teeth 48, while the other end thereof is provided with teeth 55 adapted to coöperate with the teeth 51. Non-rotatably and slidably mounted on the sleeve 53 at the end thereof adjacent the gear 45 is a sleeve 56 having its outer end provided with teeth 57 adapted to coöperate with the teeth 49 of the extension 47. Non-rotatably and slidably mounted on the sleeve 53 at the end thereof adjacent the gear 46 is a sleeve 58, the outer end of which is provided with teeth 59 adapted to coöperate with the teeth 52 on the extension 50. It will also be here noted that the teeth 57 and 59 are of greater depth than the teeth 54 and 55, the purpose of which will presently appear. Formed on the sleeve 53 between the sleeves 56 and 58 is a circumscribing flange 60 provided in its periphery with a groove 61. Embracing the sleeve 53 and having its arms engaged in the groove 61 is a yoke 62, said yoke also embracing the shaft 22 and having its upper end secured to a rod 63 slidably mounted in the front member 10. This rod also has secured thereto a guide block 64 which slides upon the rod 40. The connection between the rod 63 and the yoke 62 is strengthened by a brace 65 one end of which is secured to said yoke and the other end to the rod 63. Encircling the sleeve 53 between the sleeve 56 and the flange 60 is a spiral spring 66 one end of which bears against the flange, while the other end thereof bears against the sleeve 56. Also encircling the sleeve is a spiral spring 67 one end of which bears against the flange 60 and the other end against the sleeve 58. These springs 66 and 67 constantly tend to hold the sleeves 56 and 58 at the limit of their outward movement or in position to effect coöperation between the teeth 57 and the teeth 49 and between the teeth 59 and the teeth 52. Fixed to the front member 10 is a stub shaft 68 upon which is loosely mounted a gear 69 which meshes with both the gear 45 and the gear 27, said gear 69 being brought into play when it is desired to reverse the direction of rotation of the shaft 16.

It will be noted that the rods 40 and 63 are adapted to be connected with suitable levers for the purpose of effecting the sliding thereof, such levers being disposed at a point convenient to the operator of the automobile.

If it is desired to rotate the shaft 16 at its highest speed the rod 40 is operated to shift the sleeve 29 so as to bring the teeth 30 into interlocking relation with the teeth 21 and the teeth 33 into interlocking relation with the teeth 20. With the parts so connected the shaft 16 will rotate with the same rapidity as the shaft 22 which latter is directly connected to the engine. With the shafts 16 and 22 thus connected it will be apparent that in the event of the speed of the shaft 16 exceeding the speed of the shaft 22 the teeth 33 and the teeth 20 will serve to maintain the shafts 16 and 22 locked together so that the compression of the engine can be utilized as a brake. If it is desired to rotate the shaft 16 at an intermediate speed the rod 40 is actuated to move the sleeve 29 to lock the gear 23 to the shaft 22 and this rotation of the gear 23 will be transmitted to the shaft 16 through the gear 44, shaft 42, gear 43 and gear 17. With the parts thus connected it will also be apparent that in the event of the speed of rotation of the shaft 16 exceeding the speed of rotation of the shaft 22 the interlocking engagement between the teeth 25 and teeth 35 will enable the operator to utilize the compression of the engine for braking purposes. In this connection it will be noted that as the gear 23 is of less diameter than the gear 44 the shaft 16 will be rotated under normal condition less rapidly than the shaft 22. Again if it is desired to rotate the shaft 16 at the lowest rate of speed it is only necessary to operate the rod 63 so as to bring the sleeve 53 into the position shown in Fig. 1, which will result in the gear 46 being locked to the shaft 42 so that the rotation of the gear 28 will be transmitted to the shaft 16 through the gear 46, shaft 42, gear 43 and gear 17 and as the differences in diameter between the gears 27 and the gear 45 is greater than the differences between the diameters of the other pairs of meshing gears on the shafts 22 and 42 it will be obvious that the shaft 16 will be rotated at the least speed for forward movement of the automobile. If it is desired to reverse the direction of rotation of the shaft 16 the rod 63 is operated to move the sleeve 53 to the position shown in Fig. 2 it will lock the gear 45 to the shaft 42 and as the gear 69 intervenes between the gears 45 and gear 27 it will be apparent that the shaft 16 will be rotated oppositely to the shaft 22 so as to effect backing of the automobile.

What is claimed is:—

The combination of a frame, a drive shaft, a driven shaft disposed adjacent one end of the drive shaft, an element fixed on each of the drive and driven shafts and provided with inner and outer concentrically disposed teeth, said outer teeth being reversed with relation to the inner teeth, a sleeve non-rotatably and slidably mounted on the drive shaft and provided with teeth on each end for cooperation with the inner teeth of the adjacent element to lock said drive shaft selectively to the driven shaft, a second sleeve non-rotatably and slidably mounted on each end of the first named sleeve, each second sleeve being provided with teeth arranged for cooperation with the outer teeth of the adjacent element, a central circumscribing flange on the first named sleeve provided with a circumscribing groove, a yoke rotatably arranged in said groove, a rod slidably mounted in the frame and to which said yoke is connected, whereby the sliding of the rod will effect sliding of the first named sleeve, and springs encircling the first named sleeve and bearing at their inner ends against said flange and at their outer ends against the respective second named sleeves to normally hold the latter at the limit of their outward movement.

In testimony whereof, I affix my signature, in the presence of two witnesses.

FLOYD E. LAND.

Witnesses:
M. A. DICKERSON,
C. E. LAND.